United States Patent [19]

Pann

[11] Patent Number: 4,598,392

[45] Date of Patent: Jul. 1, 1986

[54] VIBRATORY SIGNAL SWEEP SEISMIC PROSPECTING METHOD AND APPARATUS

[75] Inventor: Keh Pann, Richardson, Tex.

[73] Assignee: Mobil Oil Corporation, New York, N.Y.

[21] Appl. No.: 517,200

[22] Filed: Jul. 26, 1983

[51] Int. Cl.[4] .......................... G01V 1/14; G01V 1/26; G01V 1/37
[52] U.S. Cl. ...................... 367/32; 367/189; 364/421
[58] Field of Search ............... 367/32, 46, 47, 49, 367/189, 190; 364/421; 181/111, 112, 113, 401; 73/642, 662

[56] References Cited

U.S. PATENT DOCUMENTS

| 3,886,493 | 5/1975 | Farr | 367/189 |
| 4,283,953 | 8/1981 | Plona | 367/86 |
| 4,312,050 | 1/1982 | Lucas | 367/43 |
| 4,339,810 | 7/1982 | Nichols et al. | 367/49 |
| 4,449,099 | 5/1984 | Hoehn | 367/49 |
| 4,458,339 | 7/1984 | Wason | 367/49 |

OTHER PUBLICATIONS

Goupillaud, "Signal Design in the Vibroseis Technique", 12/76, pp. 1291-1304, Geophysics, vol. 41, #6.

Primary Examiner—Nelson Moskowitz
Attorney, Agent, or Firm—Alexander J. McKillop; Michael G. Gilman; Charles J. Speciale

[57] ABSTRACT

Disclosed are a method and apparatus for vibratory seismic prospecting in which a vibratory signal sweep is produced by a vibrating apparatus in accordance with a power spectrum function S(f), which is proportional to a noise component function n(f) and a subsurface signal amplitude attenuation function B(f) for an area to be surveyed, to thereby produce reflection signals having an improved signal-to-noise ratio.

25 Claims, 10 Drawing Figures

AMPLITUDE SPECTRA OF THE RECORDED UNCORRELATED SIGNAL AND BACKGROUND NOISE

AMPLITUDE SPECTRA OF THE SIGNAL AND NOISE AFTER VIBROSEIS CORRELATION

AMPLITUDE SPECTRA OF SIGNAL AND NOISE AFTER THE SPECTRUM IS FLATTENED DURING PROCESSING

POWER SPECTRA OF SIGNAL AND NOISE AFTER THE SIGNAL SPECTRUM IS FLATTENED.

COMPUTATION OF SWEEP TIME FUNCTION FROM THE DESIGNED SWEEP POWER SPECTRUM

VIBRATORY SIGNAL SWEEP SEISMIC PROSPECTING METHOD AND APPARATUS

BACKGROUND OF THE INVENTION

1. Field of the Invention

The present invention relates to a seismic prospecting method and apparatus which use an improved vibratory signal sweep, and more particularly to a seismic prospecting method and apparatus which use a vibratory signal sweep which is formulated in consideration of attenuation and signal scattering characteristics of the particular earth formation target with which the vibratory signal sweep is used.

2. Description of the Prior Art

The use of vibratory apparatus in seismic prospecting is well known in the art. Commonly, a vibratory sweep is used in such apparatus to vibrate the earth. The sweep typically lasts for 20 to 30 seconds, during which time the instantaneous frequency of the vibratory oscillating signal varies linearly and monotonically with time, usually from a first lower frequency $f_1$ to a second higher frequency $f_2$. The amplitude of the oscillation signal remains substantially constant over the duration of the sweep, but it is preferably linearly tapered near the beginning and ending of the sweep to avoid signal overshoots and to facilitate signal processing of the sweep wave reflected from subsurface formations.

While this type of vibratory sweep is considered good for general purpose seismic prospecting, it has limitations since the various frequency components of the sweep are affected differently by the signal scattering and absorption effects of the earth formation. Commonly, when the vibratory sweep signal is received by a receiver after being reflected by subsurface formation conditions, the higher frequency components thereof are scattered and attenuated to a greater degree than the low frequency components. For data processing purposes, the received reflected signal waveform should have as flat an amplitude characteristic as possible. However, processing the received signal to yield a flat amplitude spectrum by amplifying (equalizing) the higher frequency components of the reflected wave also undesirably increases a background noise component at the higher frequencies, so that the noise component increases in amplitude, with increasing frequency of the vibratory sweep.

Many variations to the linear vibratory sweep discussed above have been proposed to control the amplitude of the vibratory sweep signal throughout the frequency spectrum of interest. See, for example, the paper "Signal Design In The 'Vibroseis' ® Technique" by Goupillaud, published in Geophysics, Vol. 41, No. 6, December 1976, pages 1291–1304. However, these variations are based on changing the vibratory signal sweep in accordance with a predetermined mathematical function without regard to the specific characteristics of the subsurface formation with which the vibratory apparatus is used. Accordingly, although one or more of the known vibratory sweep signal patterns may work well with one type of subsurface formation, they will not necessarily work well with other formations having different signal scattering and attenuation characteristics.

SUMMARY OF THE INVENTION

Accordingly, one object of the invention is the provision of a method and apparatus for seismic prospecting which employ an improved vibratory signal sweep pattern formulated in accordance with subsurface signal attenuation and noise characteristics of an area to be surveyed, so that the sweep pattern is optimized for a particular area being explored and the frequency spectrum of the reflected wave can be amplitude equalized, with an improved signal-to-noise ratio, thus facilitating subsequent processing of the reflected wave.

These objects are obtained in the method of the invention which comprises the steps of:

determining a subsurface amplitude attenuation function B(f) for a frequency spectrum between frequency components $f_1$ and $f_2$ for a subsurface area to be surveyed;

defining a noise component function n(f) associated with the area for the frequency spectrum;

producing a vibratory sweep signal over the frequency spectrum which is a function S(f) of the subsurface amplitude attenuation function B(f) and the noise component function n(f);

providing the vibratory sweep signal to an earth vibratory apparatus; and vibrating the earth with the apparatus.

These objects are also obtained with an apparatus of the invention which comprises:

means for generating a vibratory sweep signal over a frequency spectrum existing between a first frequency $f_1$ and a second frequency $f_2$, the vibratory sweep signal having a frequency domain power spectrum function S(f) which is a function of a frequency domain amplitude attenuation function B(f) and a frequency domain noise component function n(f) over the frequency spectrum for a subsurface area to be logged; and means responsive to the signal generating means for vibrating an earth formation with said vibratory sweep signal.

The above objects, features and advantages of the invention, as well as others, will be more clearly discerned from the ensuing detailed description of the invention which is provided in connection with the accompanying drawings.

DETAILED DESCRIPTION OF THE INVENTION

Figure 1:
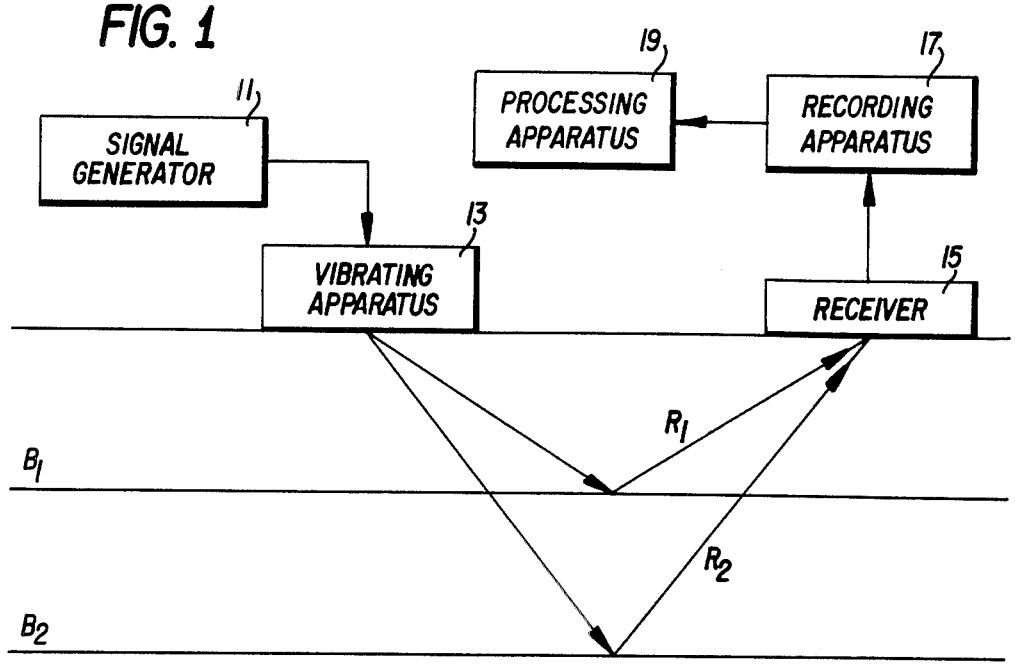
FIG. 1 shows a vibratory seismic prospecting apparatus employing the method of the invention.

To fully explain the invention, a brief description of the operation of a typical vibratory signal generating system will be first provided in connection with FIG. 1. In the ensuing description, functions denoted by (f) are represented in the frequency domain, while functions denoted by (t) are in the time domain.

Figure 2:
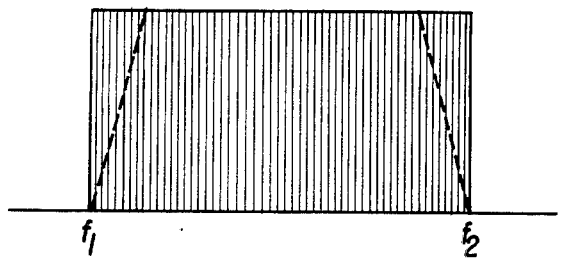
FIG. 2 shows an amplitude spectra of a conventional vibratory signal sweep.

In vibratory sweep seismic prospecting a vibratory apparatus 13 is provided as an acoustic sound source, which generates vibratory acoustic waves into an earth formation. The acoustic waves are typically generated over a time perid of 20–30 seconds, during which the frequency of the wave is varied from a lower frequency $f_1$ to a higher frequency $f_2$ with a constant amplitude, as shown in FIG. 2. The amplitude may also be tapered at the beginning and end points of the sweep, as shown by the dotted lines in FIG. 2. The acoustic waves are reflected by boundary conditions $B_1$, $B_2$, etc. in the earth formation and are received as reflected waves $R_1$, $R_2$, etc. at one or more surface receivers 15. The reflected waves $R_1$, $R_2$ are digitally recorded in recording apparatus 17 and later processed in processing apparatus 19. As well known, processing apparatus 19 produces useful information on subsurface lithology from the recorded reflection signals $R_1$, $R_2$, etc.

Figure 3:
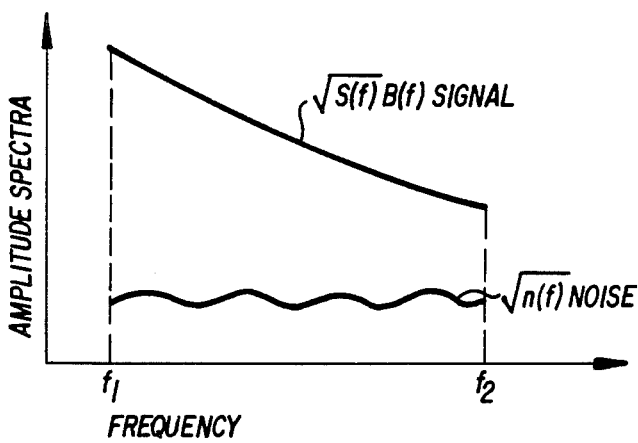
FIG. 3 shows an amplitude spectra of recorded reflection signals and background noise typically associated with the conventional vibratory signal sweep.

Assuming the acoustic wave signal, i.e., the vibratory signal, has a power spectrum function S(f), the reflection signal amplitude from a specific target depth is $\sqrt{S(f)}\, B(f)$, where B(f) represents a reflection wave amplitude attenuation characteristic. The reflection signal $\sqrt{S(f)}\, B(f)$ also has associated therewith a background noise power spectrum $\sqrt{n(f)}$. Both the reflection signal amplitude spectra and the background noise component for the FIG. 2 transmitted signal are illustrated in FIG. 3.

Figure 4:
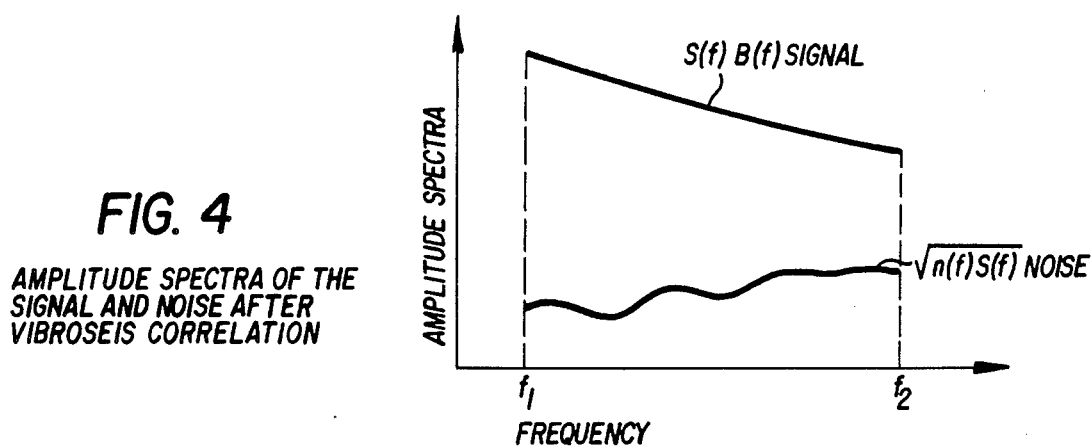
FIG. 4 shows the FIG. 3 amplitude spectra after signal correlation.
Figure 5:
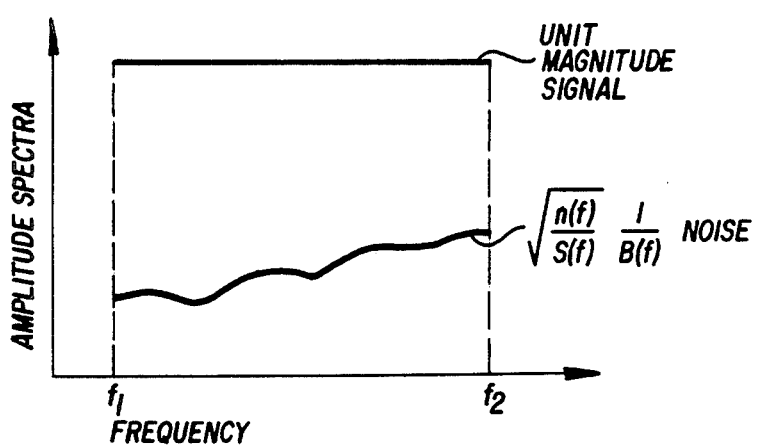
FIG. 5 shows the FIG. 4 amplitude spectra after amplitude spectrum flattening.
Figure 6:
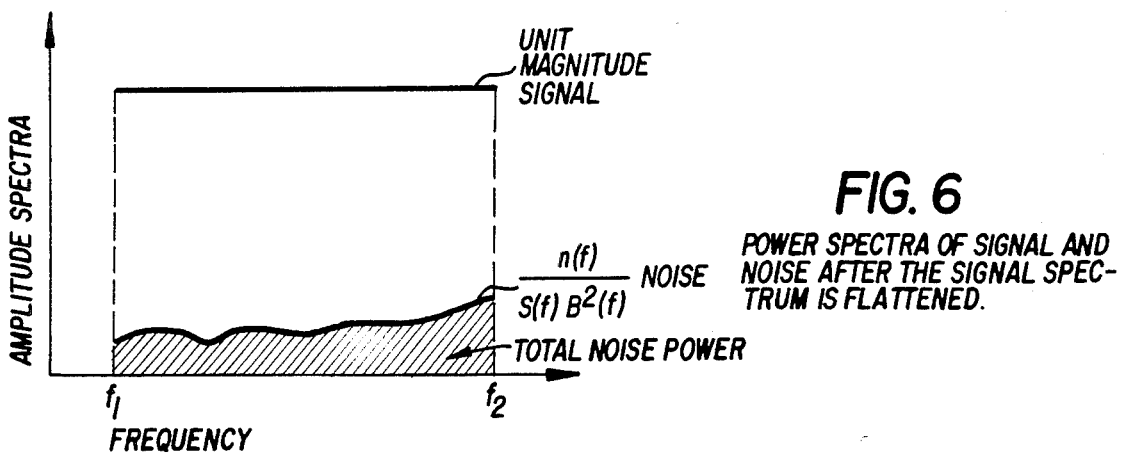
FIG. 6 shows a power spectra after the amplitude spectra of FIG. 4 is flattened.

After an autocorrelation function is applied (multiplication of the reflection signal by the square root of the sweep signal S(f)) to the recorded and received reflected waves by processing apparatus 19, the amplitude spectra becomes S(f)B(f), while the noise amplitude spectra becomes $\sqrt{n(f)S(f)}$; both are illustrated in FIG. 4. Subsequent filtering, such as by using deconvolution techniques, will flatten the reflection signal spectrum for further processing, resulting in a Klauder-like wavelet. After filtering, the signal amplitude spectra has a uniform magnitude in the frequency band ($f_1$–$f_2$) of interest. For simplicity, it will be assumed this magnitude is unity. However, the noise amplitude spectra is now $$\sqrt{\frac{n(f)}{S(f)}}\ \frac{1}{B(f)},$$

which is shown in FIG. 5. The corresponding noise power spectra $$\frac{n(f)}{S(f)B^2(f)}$$

and unit magnitude signal power spectra are illustrated in FIG. 6. As shown therein, the amount of noise present is quite significant.

The method of the invention provides a seismic prospecting method using a unique vibratory signal sweep so as to minimize the noise energy content of the reflection signals as much as possible, and increase the signal-to-noise ratio, all within the physical limitations of the vibratory apparatus 13. The unique vibrator signal sweep produced in accordance with the invention can be represented as a power spectrum in the frequency domain S(f), which must meet the following conditions:

$$\int_{f_1}^{f_2} S(f)L(f)df = C \qquad (1)$$

where S(f) is the vibratory sweep signal to be designed to optimize the signal-to-noise ratio and the function L(f) and the constant C represent physical limitations of the vibratory apparatus 13. L(f) is a function representing the vibrating time required for each frequency, such that a unit amount of vibratory energy can be supplied to the earth. This function can be experimentally determined for a given vibratory apparatus.

To optimize the signal-to-noise ratio, the noise energy content $$\frac{n(f)}{S(f)B^2(f)}$$

must be minimized under the constraints of Equation (1). Using a Lagrange multiple formulation, the following equation can be written from Equation (1) and the noise power spectra $$\frac{n(f)}{S(f)B^2(f)}:$$

$$I = \int_{f_1}^{f_2} \frac{n(f)}{S(f)B^2(f)}\, df + \lambda \int_{f_1}^{f_2} S(f)L(f)df \qquad (2)$$

which is to be/minimized. In this equation, $\lambda$ is the Lagrange multiplier, i.e., an abitrary constant scaler factor, and $f_1$, $f_2$ define the limits of the frequency band of interest.

Using variational calculus, the first variation is given by $$\delta I = \int_{f_1}^{f_2} \left( \frac{-n(f)}{S^2(f)B^2(f)} + L(f) \right) \delta S(f) df \qquad (3)$$

If $\delta I = 0$ for any variation of $\delta S(f)$, then $$\frac{-n(f)}{S^2(f)B^2(f)} + L(f) = 0 \qquad (4)$$

at each frequency within the frequency band ($f_1$, $f_2$). Or, stated otherwise, $$S(f) = \frac{1}{B(f)} \sqrt{\frac{1}{\lambda}\, \frac{n(f)}{L(f)}} \qquad (5)$$

in order to minimize noise and maximize the signal-to-noise ratio. This equation specifies that more vibratory energy (power) should be supplied at the frequency where background noise is high and attenuation is severe. Thus, when the functions n(f), B(f) and L(f) are known, the optimum power spectrum of the sweep is given by Equation 5.

Moreover, Equation 5 can be further simplified if certain assumptions are made. First, that the physical limitation function $L(f)=1$, which, in most cases, is true; and, second, that the noise power spectrum $n(f)=n$, a constant within the frequency band $f_1-f_2$ of interest. The second assumption is also generally true, as the noise component is typically uniform in amplitude across a frequency band of interest. With these assumptions, Equation 5 can be rewritten as:

$$S(f) = \frac{1}{B(f)} \sqrt{\frac{n}{\lambda}} \tag{6}$$

The attenuation function B(f) from a vibratory source to a receiver can be a measured function for a particular area of interest or it can be represented by a constant Q characteristic as follows:

$$B(f) = e^{-\alpha f} \tag{7}$$

When the attenuation function B(f) is represented by Equation 7, Equation 6 reduces to $$S(f) = \sqrt{\frac{n}{\lambda}} \, e^{(\alpha f)} \tag{8}$$

Figure 7:
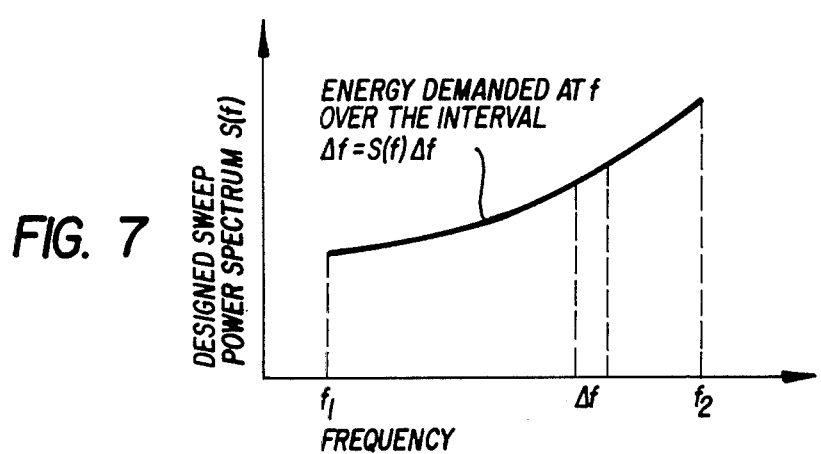
FIG. 7 shows a vibratory signal sweep power spectra produced in accordance with the method of the invention.

To determine the time sweep function f(t) for the vibratory apparatus 13, which is required to produce the power spectrum function S(f) of Equation 8, it is necessary to make further assumptions about the variations of amplitude as a function of frequency in the time domain. If the assumption of a uniform amplitude is made, more energy can be pumped into the ground at a specific frequency by keeping the vibrator operating at that frequency a proportionally longer time span. For simplicity, amplitude tapering at the beginning and end of the sweep is not considered in the design of the time sweep function. To derive the time sweep function f(t), it is noted that (as illustrated in FIG. 7) the energy at frequency f within a narrow band $\Delta f$ is proportional to $$\Delta t = \frac{dt}{df} \Delta f \tag{9}$$

This quantity should be equated to $S(f)\Delta f$ for optimum noise rejection at the correlated signal. Thus, $$\frac{dt}{df} = S(f), \text{ or} \tag{10}$$

$$dt = S(f)df = \sqrt{\frac{n}{\lambda}} \, e^{(\alpha f)} df \tag{11}$$

Integrating, one obtains, $$t - c_1 = \sqrt{\frac{n}{\lambda}} \left(\frac{1}{\alpha}\right) e^{(\alpha f)} \tag{12}$$

where $c_1$, and the factor $\sqrt{n/\lambda}$ can be determined from the design parameters T, $f_1$, and $f_2$, where T is sweep duration and $f_1$ and $f_2$ define the sweep boundaries. To determine $C_1$ and $\sqrt{n/\lambda}$, the following two conditions must be satisfied:

Condition 1. When $t=0$, $f=f_1$.
Condition 2. When $t=T$, $f=f_2$.

From Condition 1:

$$-c_1 = \sqrt{\frac{n}{\lambda}} \, \frac{1}{\alpha} \, e^{(\alpha f_1)} \tag{13}$$

Thus, $$t = \sqrt{\frac{n}{\lambda}} \, \frac{1}{\alpha} \, (e^{\alpha f} - e^{\alpha f_1}) \tag{14}$$

Condition 2 leads to:

$$T = \sqrt{\frac{n}{\lambda}} \, \frac{1}{\alpha} \, (e^{\alpha f_2} - e^{\alpha f_1}) \tag{15}$$

or, $$\sqrt{\frac{n}{\lambda}} = T\alpha \left(\frac{1}{e^{\alpha f_2} - e^{\alpha f_1}}\right) \tag{16}$$

So, $$t = T\left(\frac{e^{\alpha f} - e^{\alpha f_1}}{e^{\alpha f_2} - e^{\alpha f_1}}\right) \tag{17}$$

or $$e^{\alpha f} - e^{\alpha f_1} = \frac{t}{T}(e^{\alpha f_2} - e^{\alpha f_1}) \tag{18}$$

$$e^{\alpha f} = \frac{t}{T}(e^{\alpha f_2} - e^{\alpha f_1}) + e^{\alpha f_1} \tag{19}$$

Simplifying, produces:

$$f(t) = \frac{1}{\alpha}\left[\ln\left(t + \frac{Te^{\alpha f_1}}{e^{\alpha f_2} - e^{\alpha f_1}}\right) + \ln\left(\frac{e^{\alpha f_2} - e^{\alpha f_1}}{T}\right)\right] \tag{20}$$

Figure 8:
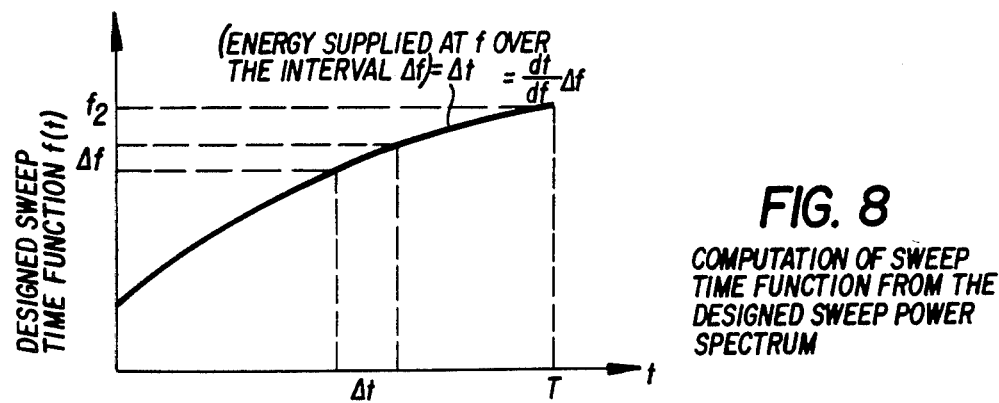
FIG. 8 shows a sweep time function for producing the vibratory signal sweep power spectra shown in FIG. 7.

This function is illustrated in FIG. 8.

A SPECIFIC EXAMPLE

A specific example of the invention is the design of a 16 second vibratory sweep from 15 Hz–100 Hz. From examining the amplitude spectrum of a dynamite explosion, which is computed from a time window from 2 seconds to 3 seconds (the target reflection is about 2.5 sec.) about the explosive time, the amplitude attenuation function (B(f)) is estimated to be flat and approximately 2.63 from 15 Hz to 100 Hz. That is, $$B(f) = e^{\alpha(f_2 - f_1)} = 2.63 \tag{21}$$

Since $f_1 = 15$ Hz, and $f_2 = 100$ Hz, then
$\alpha = 0.0114$ sec.
Also,
$e^{\alpha f_2} = 3.119$, $e^{a/1} = 1.1865$,
and
T = 16 sec.
The sweep function f(t) (Equation 20) then becomes:

$$f(t) = 87.72[\ln(t+9.8235) - 2.114] \tag{22}$$

where t is in seconds, f is in Hertz and ln is the natural logarithm.

To further illustrate the invention, two other vibratory sweep functions f(t) can also be designed for the same target depth at the same area (same attenuation B(f) and noise n(f) functions), but with
$f_1 = 15$ Hz, $f_2 = 90$ Hz and T = 16 seconds, and
$f_1 = 15$ Hz, $f_2 = 90$ Hz and T = 21 seconds
1. For
$f_1 = 15$ Hz
$f_2 = 90$ Hz
T = 16 seconds,
then, $$f(t) = 87.72[\ln(t+11.84) - 2.3]. \tag{23}$$

2. For
$f_1 = 15$ Hz
$f_2 = 90$ Hz
T = 21 seconds,
then, $$f(t) = 87.72[\ln(t+15.54) - 2.572]. \tag{24}$$

Once an optimal vibratory signal sweep has been designed, the vibratory signal is applied to vibratory apparatus 13 in the same manner as the more conventional sweep signals to generate, at one or more receivers 15, signals which, when processed by processing apparatus 19 and spectrum flattened (equalized), have an improved signal-to-noise ratio. The amplitude of the vibratory sweep signal is substantially constant over substantially the entire frequency spectrum defined by frequencies $f_1$ and $f_2$. However, amplitude tapering at the beginning and end of the vibratory signal sweep may also be applied to smooth the frequency response power function S(f) at $f_1$ and $f_2$ and to produce a sharper correlated vibratory signal sweep signature.

Figure 9:
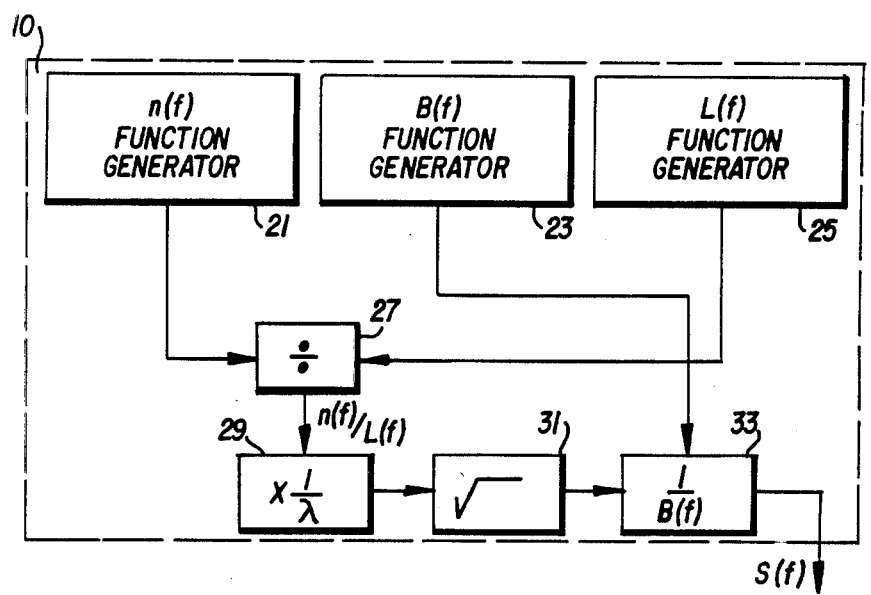
FIG. 9 shows in block diagram form a frequency domain signal generator for producing the FIG. 6 power spectra.

FIG. 9 illustrates in block diagram format the signal generating apparatus 11 required to produce the sweep power spectrum function S(f) described above with reference to Equation (5). It includes frequency domain function generators n(f), B(t) and L(t), denoted as elements 21, 23 and 25, a divider 27, a (1/λ) multiplier 29, a square root circuit 31 and an inverter/multiplier 33. The various function generators can be configured as ROM stored digitized functions which are read out to a digital-to-analog converter.

Figure 10:
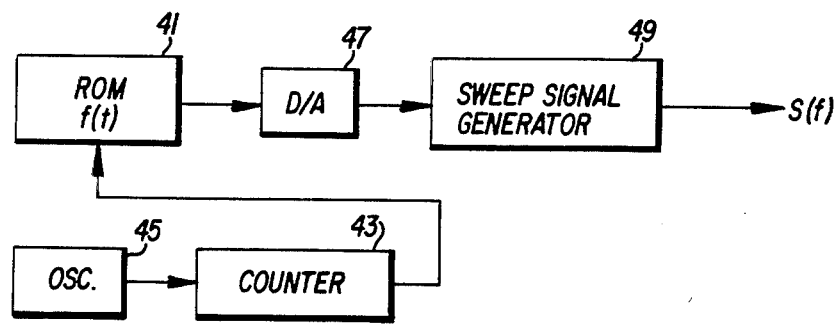
FIG. 10 shows in block diagram form a time domain signal generator for producing the FIG. 6 power spectra.

In the time domain, once a specific time sweep function f(t) is determined for a specific application, the signal generating apparatus 11 can be formed as shown in FIG. 10. The time sweep function f(t) for a particular application can be digitally stored in ROM 41 and read out by sequential address signals generated by counter 43, counting the output pulses of oscillator 45. The digitized function f(t) is then converted into an analog signal by digital-to-analog converter 47, which controls the sweep rate of sweep signal generator 49 to produce an output signal having the desired frequency domain power spectrum S(f).

Although a preferred embodiment of the method and apparatus of the invention has been described above, it should be apparent that many modifications can be made thereto without departing from the spirit and scope of the invention. Accordingly, the invention is not limited by the foregoing description, but is only limited by the scope of the appended claims.

I claim:

1. A method for seismic surveying using a vibratory signal sweep comprising the steps of:
   determining a frequency domain subsurface amplitude attenuation function B(f) for a frequency spectrum existing between frequency components $f_1$ and $f_2$ for a subsurface area to be surveyed;
   determining a frequency domain noise component function n(f) associated with said area for said frequency spectrum; and
   producing a vibratory sweep signal over said frequency spectrum which has a frequency domain power spectrum function S(f) which is a function of said subsurface amplitude attenuation function B(f) and said noise component function n(f).

2. The method of claim 1, further comprising the steps of:
   providing said vibratory sweep signal to an earth vibratory apparatus; and
   vibrating the earth with said apparatus.

3. A method as in claim 1, wherein said vibratory sweep signal power spectrum function S(f) is a function proportional to the square root of said noise component function n(f) and inversely proportional to said amplitude attenuation function B(f).

4. A method according to claim 3, wherein said vibratory sweep signal power spectrum function is defined as follows:

$$S(f) = \frac{1}{B(f)} \sqrt{\frac{n(f)}{\lambda}}$$

where λ is an arbitrary scale factor.

5. A method according to claim 3, further comprising the step of determining a function L(f) representing the vibrating time required for a particular vibrating apparatus to produce a unit amount of vibratory energy into the earth for each frequency within said spectrum, and wherein said vibratory sweep signal function S(f) is proportional to the square root of a quantity obtained by dividing said noise component function n(f) by said physical limitation function L(f).

6. A method according to claim 5, wherein said vibratory signal sweep power spectrum function is as follows:

$$S(f) = \frac{1}{B(f)} \sqrt{\frac{1}{\lambda} \frac{n(f)}{L(f)}}$$

where λ is an arbitrary scale factor.

7. A method according to claim 2, further comprising the steps of
   receiving and recording a reflection signal produced by vibrating the earth with said sweep signal power spectrum function S(f).

8. A method according to claim 4, wherein said vibratory signal sweep power spectrum function is as follows:

$$S(f) = \frac{1}{B(f)} \sqrt{\frac{n}{\lambda}}$$

where n(f) is represented as a noise component constant n.

9. A method according to claim 1, wherein said power spectrum function S(f) is produced in accordance with a time function f(t) for operation of a sweep signal generator which is defined as follows:

$$f(t) = \frac{1}{\alpha}\left[\ln\left(t + \frac{Te^{\alpha f_1}}{e^{\alpha f_2} - e^{\alpha f_1}}\right) + \ln\left(\frac{e^{\alpha f_2} - e^{\alpha f_1}}{T}\right)\right]$$

where t represents the instantaneous time of the sweep, T represents the duration of the sweep, $f_1$ and $f_2$ are the starting and ending frequencies of the sweep and $\alpha$ is derived from the equation $B(f)=e^{\alpha(f_2-f_1)}$.

10. A method as in claim 1, wherein said vibratory sweep signal has a substantially constant amplitude over at least a substantial portion of the frequency spectrum defined by $f_1$ and $f_2$.

11. A method as in claim 10, wherein said vibratory sweep signal is amplitude tapered at the beginning and ending portions thereof and otherwise has said constant amplitude over said frequency spectrum.

12. A method as in claim 1, wherein said amplitude attenuation function B(f) is a constant Q function of the form $B(f)=e^{-\alpha f}$.

13. A method as in claim 1, wherein said noise function n(f) is defined as a constant value over said frequency spectrum.

14. An apparatus for vibratory sweep signal seismic prospecting comprising:
 means for generating a vibratory sweep signal over a frequency spectrum existing between a first frequency $f_1$ and a second frequency $f_2$, said vibratory sweep signal having a frequency domain power spectrum function S(f) which is a function of a frequency domain amplitude attenuation function B(f) and a frequency domain noise component function n(f) over said frequency spectrum for a subsurface area to be surveyed; and
 means responsive to said signal generating means for vibrating an earth formation with said vibratory sweep signal.

15. An apparatus as in claim 14, wherein said vibratory sweep signal power spectrum function S(f) is a function proportional to the square root of said noise component function n(f) and inversely proportional to said amplitude attenuation function B(f).

16. An apparatus according to claim 15, wherein said vibratory sweep signal power spectrum function is defined as follows:

$$S(f) = \frac{1}{B(f)} \sqrt{\frac{n(f)}{\lambda}}$$

where $\lambda$ is an arbitrary scale factor.

17. An apparatus as in claim 14, wherein said frequency domain power spectrum function S(f) is further proportional to a frequency domain function L(f) which represents the vibrating time required by said vibrating means for each frequency in said spectrum to produce a unit amount of energy into the earth.

18. An apparatus according to claim 17, wherein said vibratory signal sweep power spectrum function is as follows:

$$S(f) = \frac{1}{B(f)} \sqrt{\frac{1}{\lambda} \frac{n(f)}{L(f)}}$$

where $\lambda$ is an arbitrary scale factor.

19. An apparatus as in claim 14, further comprising means for receiving and recording a reflection signal produced by vibrating the earth with said vibratory sweep signal.

20. An apparatus according to claim 16, wherein said vibratory signal sweep power spectrum function is as follows:

$$S(f) = \frac{1}{B(f)} \sqrt{\frac{n}{\lambda}}$$

where n(f) is represented as a noise component constant n.

21. An apparatus according to claim 14, wherein said power spectrum function S(f) is produced in accordance with a time function f(t) for said generating means which is defined as follows:

$$f(t) = \frac{1}{\alpha}\left[\ln\left(t + \frac{Te^{\alpha f_1}}{e^{\alpha f_2} - e^{\alpha f_1}}\right) + \ln\left(\frac{e^{\alpha f_2} - e^{\alpha f_1}}{T}\right)\right]$$

where t represents the instantaneous time of the sweep, T represents the duration of the sweep, $f_1$ and $f_2$ are the starting and ending frequencies of the sweep and $\alpha$ is derived from the equation $B(f)=e^{\alpha(f_2-f_1)}$.

22. An apparatus as in claim 14, wherein said vibratory sweep signal has a substantially constant amplitude over at least a substantial portion of the frequency spectrum defined by $f_1$ and $f_2$.

23. An apparatus as in claim 22, wherein said vibratory sweep signal is amplitude tapered at the beginning and ending portions thereof and otherwise has said constant amplitude over said frequency spectrum.

24. An apparatus as in claim 14, wherein said amplitude attenuation function B(f) is a constant Q function of the form $B(f)=e^{-\alpha f}$.

25. A method as in claim 14, wherein said noise function n(f) is defined as a constant value over said frequency spectrum.

* * * * *